United States Patent
Bellenger et al.

(10) Patent No.: US 11,750,368 B2
(45) Date of Patent: *Sep. 5, 2023

(54) PROVISIONING METHOD AND SYSTEM WITH MESSAGE CONVERSION

(71) Applicant: Visa International Service Association, San Francisco, CA (US)

(72) Inventors: Thomas Bellenger, Pacifica, CA (US); Barbara Patterson, South San Francisco, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/686,306

(22) Filed: Mar. 3, 2022

(65) Prior Publication Data

US 2022/0191002 A1    Jun. 16, 2022

Related U.S. Application Data

(63) Continuation of application No. 16/554,955, filed on Aug. 29, 2019, now Pat. No. 11,296,862.

(51) Int. Cl.
*H04L 9/06* (2006.01)
*H04L 9/08* (2006.01)

(52) U.S. Cl.
CPC .............. *H04L 9/06* (2013.01); *H04L 9/0877* (2013.01); *H04L 9/0897* (2013.01)

(58) Field of Classification Search
CPC ........ H04L 9/06; H04L 9/0897; H04L 9/0877
See application file for complete search history.

(56) References Cited

U.S. PATENT DOCUMENTS

| 6,449,633 B1 | 9/2002 | Van et al. |
| 7,937,324 B2 | 5/2011 | Patterson |

(Continued)

FOREIGN PATENT DOCUMENTS

| EP | 2182479 A1 | 5/2010 |
| WO | 2016033610 A1 | 3/2016 |
| WO | 2020122898 A1 | 6/2020 |

OTHER PUBLICATIONS

U.S. Appl. No. 16/554,955, "First Action Interview Pilot Program Pre-Interview Communication", dated Feb. 1, 2021, 4 pages.

(Continued)

*Primary Examiner* — Viral S Lakhia
(74) *Attorney, Agent, or Firm* — Kilpatrick Townsend & Stockton LLP

(57) ABSTRACT

A method is disclosed. The method comprises receiving, from a communication device, a provisioning request message including a user device identifier and a cryptogram in a first message format, which is received from the user device by the communication device during a message exchange process between the user device and the communication device. The method also includes generating an authorization request message in a second message format, the authorization request message comprising the cryptogram, transmitting the authorization request message to an authorizing computer, and receiving an authorization response message from the authorizing computer. The method also includes providing access data to the communication device.

14 Claims, 10 Drawing Sheets

(56) References Cited

U.S. PATENT DOCUMENTS

| | | | |
|---|---|---|---|
| 8,346,666 B2 | 1/2013 | Lindelsee et al. | |
| 8,423,415 B2 | 4/2013 | Sahota et al. | |
| 9,667,416 B1 | 5/2017 | Machani et al. | |
| 9,727,862 B2 | 8/2017 | O'Connell et al. | |
| 9,736,154 B2 | 8/2017 | Wilson et al. | |
| 9,824,082 B2 | 11/2017 | Agrawal et al. | |
| 9,830,595 B2 | 11/2017 | Anderson et al. | |
| 9,972,005 B2 | 5/2018 | Wong et al. | |
| 10,032,171 B2 * | 7/2018 | Yeager | G06Q 20/3223 |
| 10,475,024 B1 | 11/2019 | Behren et al. | |
| 10,491,389 B2 | 11/2019 | Girish et al. | |
| 10,601,818 B2 * | 3/2020 | Le Saint | G06Q 20/38215 |
| 10,693,638 B1 | 6/2020 | Cignetti et al. | |
| 10,861,019 B2 * | 12/2020 | Prakash | G06Q 20/3224 |
| 10,891,610 B2 | 1/2021 | Powell et al. | |
| 10,922,132 B1 | 2/2021 | Shiramshetti et al. | |
| 10,956,899 B2 * | 3/2021 | Tanner | G06Q 20/401 |
| 11,095,449 B2 * | 8/2021 | Wang | H04L 9/3247 |
| 11,134,065 B2 * | 9/2021 | Amar | H04L 63/0435 |
| 11,296,862 B2 | 4/2022 | Bellenger et al. | |
| 11,348,103 B2 * | 5/2022 | Gleeson | G06Q 20/40975 |
| 2011/0022521 A1 | 1/2011 | Collinge et al. | |
| 2014/0372323 A1 | 12/2014 | Balasubramanian et al. | |
| 2015/0032627 A1 | 1/2015 | Dill et al. | |
| 2015/0046338 A1 | 2/2015 | Laxminarayanan et al. | |
| 2015/0046339 A1 | 2/2015 | Wong et al. | |
| 2015/0339649 A1 | 11/2015 | Pi Farias | |
| 2016/0034900 A1 | 2/2016 | Nelsen et al. | |
| 2016/0065370 A1 * | 3/2016 | Le Saint | H04L 9/0861 713/155 |
| 2016/0148197 A1 | 5/2016 | Dimmick | |
| 2016/0241402 A1 * | 8/2016 | Gordon | H04W 12/068 |
| 2016/0267486 A1 | 9/2016 | Mitra et al. | |
| 2017/0200149 A1 * | 7/2017 | Antunovic | G07B 15/02 |
| 2017/0270517 A1 | 9/2017 | Vasu et al. | |
| 2017/0278096 A1 | 9/2017 | Chitalia et al. | |
| 2018/0316676 A1 | 11/2018 | Gilpin et al. | |
| 2019/0180275 A1 | 6/2019 | Safak | |
| 2019/0303915 A1 * | 10/2019 | Hammad | G06F 21/34 |
| 2019/0303919 A1 * | 10/2019 | Aabye | G06Q 20/36 |
| 2019/0333055 A1 * | 10/2019 | Mohammed | H04L 9/3234 |
| 2019/0385160 A1 * | 12/2019 | Safak | G06Q 20/3829 |
| 2021/0049614 A1 * | 2/2021 | Jurss | G06Q 20/40975 |

OTHER PUBLICATIONS

U.S. Appl. No. 16/554,955, "Non-Final Office Action", dated Jun. 4, 2021, 15 pages.

U.S. Appl. No. 16/554,955, "Notice of Allowance", dated Dec. 6, 2021, 18 pages.

U.S. Appl. No. 17/413,441, "U.S. Patent Application No.", Provisioning Initiated From a Contactless Device, filed Dec. 12, 2018.

EP20858832.7, "Extended European Search Report", dated Sep. 22, 2022, 10 pages.

PCT/US2020/047760, "International Preliminary Report on Patentability", dated Mar. 10, 2022, 11 pages.

PCT/US2020/047760, "International Search Report and Written Opinion", dated Nov. 27, 2020, 16 pages.

* cited by examiner

PROVISIONING METHOD AND SYSTEM WITH MESSAGE CONVERSION

CROSS-REFERENCE TO RELATED APPLICATIONS

This application is a continuation of U.S. patent application Ser. No. 16/554,955 filed Aug. 29, 2019 entitled "Provisioning Method And System With Message Conversion", the contents of which are enclosed in their entirety for all purposes.

BACKGROUND

Systems and methods for provisioning access data to communication devices such as mobile phones are known. For example, access data such as security data may be provisioned to a communication device so that a user of the communication device can use it to access a resource, such as data, a restricted area, or goods and services.

A number of problems, however, exist with existing provisioning systems and methods. For example, a user can manually enter an identifier (e.g., an access code, an account number, etc.) for access data to be provisioned into the communication device, and the communication device can request the access data from a remote server computer. However, the manual entry of data into the communication device is cumbersome and prone to data entry errors. Further, the manual entry of data may not be secure. For example, if the identifier needed to provision access data to the communication device is stolen or intercepted from a legitimate user by an unauthorized person, then the unauthorized person could provision his own communication device with the access data.

Another problem that that needs to be addressed is the ability to authenticate a user or device to ensure that the user or device is authorized to receive access data. Certain authorizing entities may be the appropriate ones to authenticate the users and/or devices, but they may not have the infrastructure to perform provisioning processes. Further, there can be many different authorizing entities, and it is cumbersome for each and every authorizing entity to create an infrastructure to provision access data. Along the same lines, processing computers may have the ability to provision access data, but may not have the ability to verify that the user requesting the provisioning of access data is in possession of an authentic user device.

Embodiments of the disclosure address these and other problems, individually and collectively.

SUMMARY

One embodiment includes a method comprising receiving, by the server computer from a communication device, a provisioning request message including a user device identifier and a cryptogram in a first message format, which is received from a user device by the communication device during a message exchange process between the user device and the communication device; generating, by the server computer, an authorization request message in a second message format, the authorization request message comprising the cryptogram; transmitting, by the server computer, the authorization request message to an authorizing computer; receiving, by the server computer, an authorization response message from the authorizing computer; and in response to receiving the authorization response message, providing, by the server computer, access data to the communication device.

Another embodiment includes a server computer comprising: a processor; and a computer readable medium, the computer readable medium comprising code. The code is executable by the processor to implement a method comprising: receiving, from a communication device, a provisioning request message including a user device identifier and a cryptogram in a first message format, which is received from a user device by the communication device during a message exchange process between the user device and the communication device; generating an authorization request message in a second message format, the authorization request message comprising the cryptogram; transmitting the authorization request message to an authorizing computer; receiving an authorization response message from the authorizing computer; and in response to receiving the authorization response message, providing, by the server computer, access data to the communication device.

Another embodiment includes a method comprising: performing, by a communication device, a message exchange process with a user device, wherein a cryptogram is received from the user device by the communication device during the message exchange process; transmitting, by the communication device, a provisioning request message including a user device identifier and the cryptogram to a server computer, which generates an authorization request message comprising the cryptogram, transmits the authorization request message to an authorizing computer, which verifies the cryptogram; and receiving, by the communication device, access data in response to transmitting the provisioning request message.

Another embodiment includes a communication device comprising: a processor; and a computer readable medium coupled to the processor. The computer readable medium comprises code, executable by the processor, for implementing a method comprising: performing a message exchange process with a user device, wherein a cryptogram is received from the user device by the communication device during the message exchange process; transmitting a provisioning request message including a user device identifier and the cryptogram to the server computer, which generates an authorization request message comprising the cryptogram, transmits the authorization request message to an authorizing computer, which verifies the cryptogram; and receiving access data in response to transmitting the provisioning request message.

Further details regarding embodiments of the disclosure are described in the Detailed Description and the Figures.

DETAILED DESCRIPTION

Figure 1:
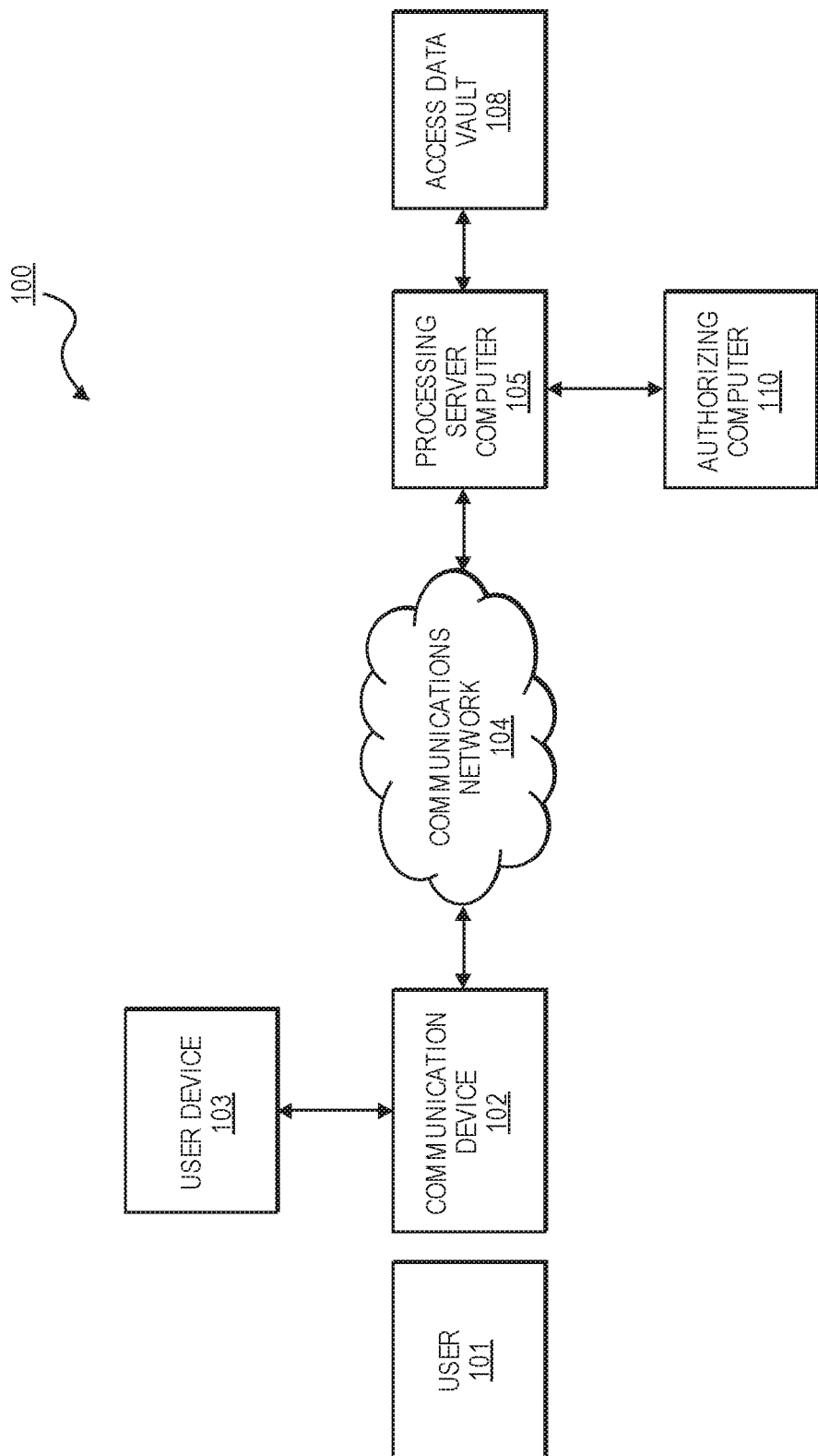
FIG. 1 shows a block diagram of a system according to an embodiment.

Embodiments can include methods and systems that can provision access data to a communication device. However, the provisioning of the access data can be dependent upon the user's possession of a legitimate user device. For example, the user device can be a building access card or a payment card. The user may want to have the ability to use a communication device such as a mobile phone so that it can operate like the user device. To do this, the user needs to be in possession of the legitimate user device. The user will interface the user device with the communication device. During the interfacing, a message exchange process will occur, such that the mobile device emulates a standard reader for the activity to be conducted. For example, the activity may be a payment transaction, and the communication device can emulate a point of sale terminal. In another example, the activity may be accessing a restricted location such as a building. The communication device can be programmed to emulate a badge reader. By allowing the communication device to emulate the type of reader for the intended activity, the user device can be authenticated in a manner that would be similar to the way that the intended activity would occur. As such, any server computer that is requested to provision access data can be assured that it is provisioning access data to a legitimate and authorized communication device.

Embodiments improve upon conventional systems. By requiring that a user provide a legitimate user device to a communication device before allowing that communication device to be provisioned with access data by a server computer, the server computer can be assured that it is provisioning access data to a legitimate and authorized communication device. Further, since the user need not manually enter any data into the communication device in embodiments, fewer data entry errors will occur compared to conventional systems. Lastly, since embodiments can use a message exchange process that simulates an actual activity of the user device, the user device can be authenticated using protocols that are existing, but are used in a different manner. As such, embodiments can be easier to implement than systems that might otherwise require specialized programming for the provisioning function.

Other advantages of embodiments can include the use of a central server computer that can receive a request message in a first message format, and then utilize an existing communication network using a pre-defined second message format to confirm with an authorizing computer that a user is in possession of an authentic user device. The pre-defined second message format may be a format such as an ISO 8583 format. The communication network can be configured to seek approval for transactions such as financial transactions. The communication network can be utilized to obtain verification that a user is in possession of an authentic user device (e.g., a payment card), before allowing the user's communication device to be provisioned with access data. The verification can be performed using a standard message such as a standard financial message, and not a specifically designed authentication request message. This is useful, because in some instances, different authorizing computers (e.g., different issuer computers) may hold different keys to validate cryptograms that may originate from various user devices held by different users. As an alternative to embodiments of the invention, the only way for authorizing computers to validate cryptograms for the purposes of provisioning access data would be to re-design each authorization computer with a specific communication protocol and process for validation. By using embodiments of the invention, each authorizing computer need not create a new provisioning system. Rather, using embodiments, one central server computer can utilize an existing infrastructure, and existing authorization request and response messages with existing message formats to validate cryptograms from user devices before allowing communication devices to be provisioned with access data.

Prior to discussing the details of some embodiments of the present disclosure, description of some terms may be helpful in understanding the various embodiments.

A "communication device" (sometimes referred to as a mobile communication device or mobile device) may comprise any suitable electronic device that may be transported and operated by a user, which may also provide remote communication capabilities to a network. A mobile communication device may communicate using a mobile phone (wireless) network, wireless data network (e.g., 3G, 4G or similar networks), Wi-Fi, Bluetooth, Bluetooth Low Energy (BLE), Wi-Max, or any other communication medium that may provide access to a network such as the Internet or a private network. Examples of mobile communication devices include mobile phones (e.g. cellular phones), PDAs, tablet computers, net books, laptop computers, wearable devices (e.g., watches), vehicles such as automobiles and motorcycles, personal music players, hand-held specialized readers, etc. A mobile device may comprise any suitable hardware and software for performing such functions, and may also include multiple devices or components (e.g., when a device has remote access to a network by tethering to another device—i.e. using the other device as a modem—both devices taken together may be considered a single mobile device).

A "contactless" communication may be a communication in which data is exchanged between two devices without the need for the devices to be physically coupled. Without limiting the generality of the foregoing, "contactless" communication can include data transmissions by near-field communication (NFC) transceiver, laser, radio frequency, infrared communications, or other radio frequency or wireless communication protocols such as Bluetooth, Bluetooth low-energy (BLE), Wi-Fi, iBeacon, etc.

A "user device" may be any suitable device that can be used by a user. A "user device" may be in any suitable form. Some examples of user devices include cards (e.g., debit, credit, and prepaid cards) with magnetic stripes or contactless elements (e.g., including contactless chips and antennas), fobs, wearable devices, mobile phones, tablet computers, etc. In some embodiments, a user device has less functionality than a communication device that is used by the user. For example, in some embodiments, the communication device can be a mobile phone with a long range antenna. The user device can be a payment card that does not have a long range antenna, but has a contactless element with a short range antenna.

A "resource provider" can be an entity that provides resources (e.g., goods, services, access to secure data, access to locations, or the like) during a transaction. For example, a resource providing entity can be a merchant, a venue operator, a building owner, a governmental entity, etc. A "merchant" may typically be an entity that engages in transactions and can sell goods or services, or provide access to goods or services.

An "application" may be a computer program that is used for a specific purpose. Examples of applications may include transit applications, secure data access applications, banking applications, digital wallet applications, etc.

"Authentication data" may include any data suitable for authenticating an entity. Authentication data may be obtained from a user or a device that is operated by the user. Examples of authentication data obtained from a user may include PINs (personal identification numbers), biometric data, passwords, etc. Examples of authentication data that may be obtained from a device may be include device serial numbers, hardware secure element identifiers, device fingerprints, phone numbers, IMEI numbers, etc.

"Access data" may include any suitable data that can be used to access a resource or create data that can access a resource. In some embodiments, access data may be account information for a payment account. Account information may include a PAN, payment token, expiration date, verification values (e.g., CVV, CVV2, dCVV, dCVV2), etc. In other embodiments, access data may be data that can be used to activate account data. For example, in some cases, account information may be stored on a mobile device, but may not be activated until specific information is received by the mobile device. In other embodiments, access data could include data that can be used to access a location. Such access data may be ticket information for an event, data to access a building, transit ticket information, etc. In yet other embodiments, access data may include data used to obtain access to sensitive data. Examples of access data may include codes or other data that are needed by a server computer to grant access to the sensitive data.

An "access request" may include a request for access to a resource. The resource may be a physical resource (e.g., good), digital resources (e.g., electronic document, electronic data, etc.), or services. In some cases, an access request may be submitted by transmission of an access request message that includes access request data. Typically a device associated with a requestor may transmit the access request message to a device associated with a resource provider.

"Access request data" may include any information surrounding or related to an access request. Access request data may include access data. Access request data may include information useful for processing and/or verifying the access request. For example, access request data may include details associated with entities (e.g., resource provider computer, processing server computer, authorization computer, etc.) involved in processing the access request, such as entity identifiers (e.g., name, etc.), location information associated with the entities, and information indicating the type of entity (e.g., category code). Exemplary access request data may include information indicating an access request amount, an access request location, resources received (e.g., products, documents, etc.), information about the resources received (e.g., size, amount, type, etc.), resource providing entity data (e.g., resource provider data, document owner data, etc.), user data, date and time of an access request, a method utilized for conducting the access request (e.g., contact, contactless, etc.), and other relevant information.

An "access device" may be any suitable device for providing access to something. An access device may be in any suitable form. Some examples of access devices include point of sale (POS) devices, cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, Websites, and the like. An access device may use any suitable contact or contactless mode of operation to send or receive data from, or associated with, a user device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a user device.

An "electronic wallet" or "digital wallet" can include an electronic device that allows an individual to conduct electronic commerce transactions. A digital wallet may store user profile information, credentials, bank account information, one or more digital wallet identifiers and/or the like and can be used in a variety of transactions, such as, but not limited to, eCommerce transactions, social network transactions, money transfer/personal payment transactions, mobile commerce transactions, proximity payment transactions, gaming transactions, etc. A digital wallet may be designed to streamline the purchase and payment process. A digital wallet may allow the user to load one or more payment cards onto the digital wallet so as to make a payment without having to enter an account number or present a physical card.

A "credential" may be any suitable information that serves as reliable evidence of worth, ownership, identity, or authority. A credential may be a string of numbers, letters, or any other suitable characters, as well as any object or document that can serve as confirmation. Examples of credentials include value credentials, identification cards, certified documents, access cards, passcodes and other login information, etc. Other examples of credentials include PANs (primary account numbers), PII (personal identifiable information) such as name, address, and phone number, and the like.

An "authorizing entity" may be an entity that authorizes a request, typically using an authorizing computer to do so. An authorizing entity may be an issuer, a governmental agency, a document repository, an access administrator, etc. An "issuer" may typically include a business entity (e.g., a bank) that maintains an account for a user. An issuer may also issue payment credentials stored on a user device, such as a cellular telephone, smart card, tablet, or laptop to the user.

A "service provider" may be an entity that can provide a resource such as goods, services, information, and/or access typically through a service provider computer. Examples of service providers include data providers, transit agencies, merchants, digital wallets, payment processors, etc.

A "user" may include an individual or a computational device. In some embodiments, a user may be associated with one or more personal accounts and/or mobile devices. In some embodiments, the user may be a cardholder, account holder, or consumer.

A "token" may be a substitute value for a credential. A token may be a string of numbers, letters, or any other suitable characters. Examples of tokens include payment tokens, access tokens, personal identification tokens, etc.

A "payment token" may include an identifier for a payment account that is a substitute for an account identifier, such as a primary account number (PAN). For example, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing transaction processing networks (e.g., ISO 8583 financial transaction message format). In some embodiments, a token may be used in place of a PAN to initiate, authorize, settle or resolve a payment transaction or represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

A "key" may include a piece of information that is used in a cryptographic algorithm to transform data into another representation. A cryptographic algorithm can be an encryption algorithm that transforms original data into an alternate representation, or a decryption algorithm that transforms encrypted information back to the original data. Examples of cryptographic algorithms may include triple data encryption standard (TDES), data encryption standard (DES), advanced encryption standard (AES), etc. An "encryption key" may include any data value or other information suitable to cryptographically encrypt data. A "decryption key" may include any data value or other information suitable to decrypt encrypted data. In some cases, the same key used to encrypt data and decrypt data may be known as a symmetric encryption key.

A "session key" may include any key used to encrypt or decrypt data to be securely communicated between two computers. In some cases, a session key may be generated from a shared secret known both to a sending entity and a receiving entity. For example, the session key may be derived using a key derivation function and the shared secret. A session key can be used to protect data included in a request or response message.

A "cryptogram" may include a piece of encrypted text. In some embodiments, a cryptogram can be used to authenticate an entity such as a device or a user. A cryptogram may comprise static data, dynamic data, or a combination of the two that is encrypted using an encryption key (e.g., a session key or a unique derived key).

An "authorization request message" may be an electronic message that is sent to a payment processing network and/or an issuer of a payment card to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), an expiration date, etc. An authorization request message may also comprise "transaction information," such as any information associated with a current transaction, such as the transaction amount, merchant identifier, merchant location, etc., as well as any other information that may be utilized in determining whether to identify and/or authorize a transaction.

An "authorization response message" may be an electronic message reply to an authorization request message generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant's access device (e.g., POS equipment) that indicates approval of the transaction. The code may serve as proof of authorization. As noted above, in some embodiments, a payment processing network may generate or forward the authorization response message to the merchant.

A "server computer" is typically a powerful computer or cluster of computers. For example, the server computer can be a large mainframe, a minicomputer cluster, or a group of servers functioning as a unit. In one example, the server computer may be a database server coupled to a Web server.

A "processor" may include any suitable data computation device or devices. A processor may comprise one or more microprocessors working together to accomplish a desired function. The processor may include CPU comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

Details of some embodiments of the present disclosure will now be described in greater detail.

FIG. 1 shows a system 100 comprising a number of components according to an embodiment of the invention. The system 100 comprises a user device 103, which may be associated with a user 101, a communication device 102, a communications network 104, a processing server computer 105, an authorizing computer 110, and an access data vault 108. For clarity, a certain number of components are shown in FIG. 1. It is understood that embodiments of the disclosure may include more than one of each component. Also, some embodiments may include fewer than or greater than all of the components shown in FIG. 1.

The user device 103, the communication device 102, the processing server computer 105, the authorizing computer 110, and the access data vault 108 may all be in operative communication with each other through any suitable communication channel or communications network 104. Suitable communications networks may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. Messages between the computers, networks, and devices may be transmitted using a secure communications protocols such as, but not limited to, File Transfer Protocol (FTP); HyperText Transfer Protocol (HTTP); Secure Hypertext Transfer Protocol (HTTPS), Secure Socket Layer (SSL), ISO (e.g., ISO 8583) and/or the like.

In some embodiments, the communication device 102 may include a service provider application such as a mobile wallet application, payment application, or access application that may be provisioned with access data to enable the communication device 102 to conduct access transactions. Also, in some embodiments, the user device 103 may be in operative communication with the communication device 102 through contactless communication.

Figure 2:
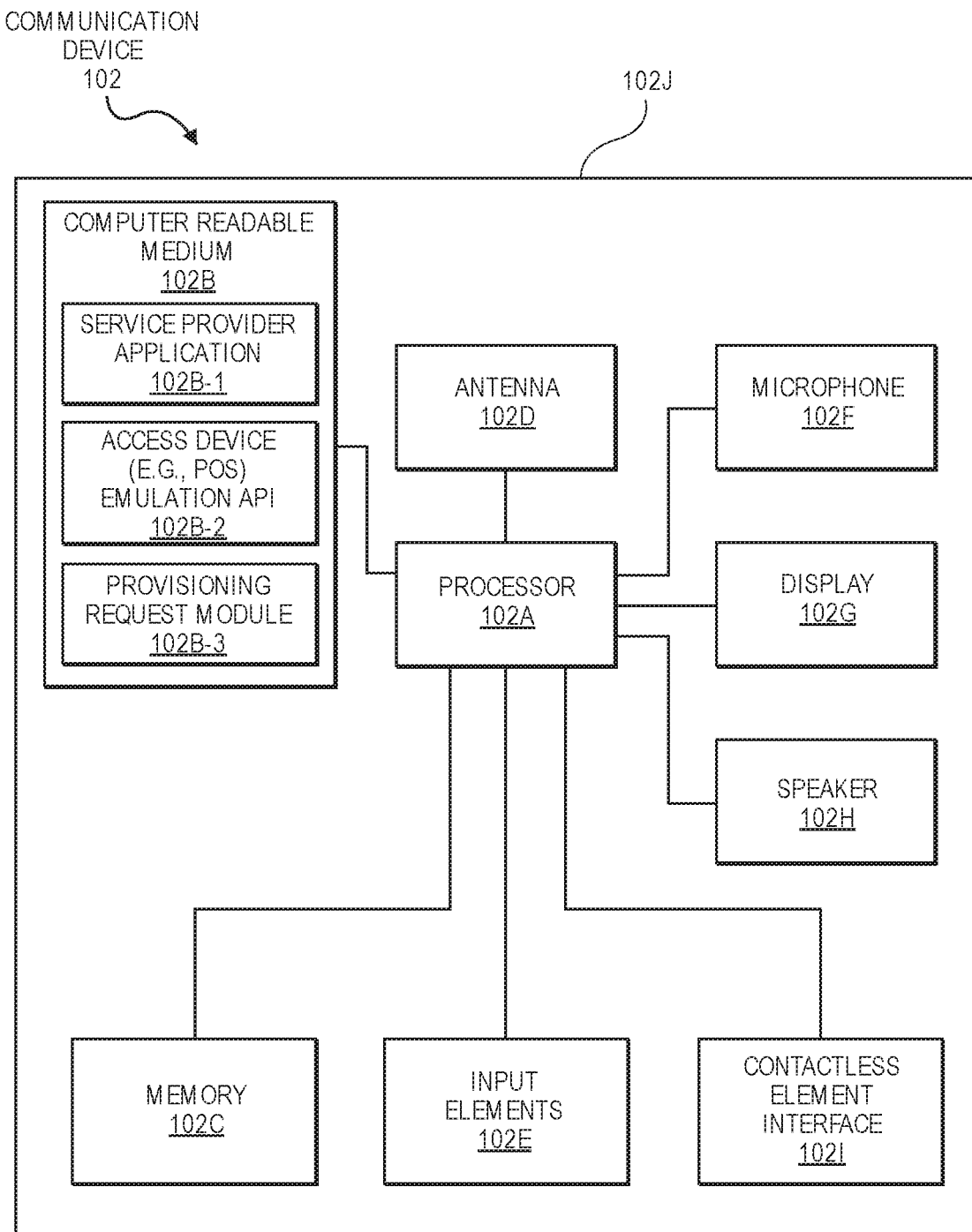
FIG. 2 shows a block diagram of a communication device according to an embodiment.

FIG. 2 shows a block diagram of a communication device 102 according to an embodiment. In some embodiments, a communication device 102 may be a device that can be used to communicate with external entities as well as gain access to certain resources. For example, the communication device 102 may be a mobile phone, which may be used to make payments or gain access to a location or secure data. Referring to FIG. 2, the communication device 102 may comprise a computer readable medium 102B and a memory 102C, which are present within a body 102J. The body 102J may be in the form a plastic substrate, housing, or other structure. In some cases, the memory 102C may be a secure element, and/or may also store information such as access data such as tokens, PANs, tickets, etc. Information in the memory 102C may be transmitted by the communication device 102 to another device using an antenna 102D or contactless element interface 102I.

The communication device 102 may also include a processor 102A (e.g., a microprocessor) for processing the functions of the communication device 102 and a display 102G to allow a user to view information. The communication device 102 may further include input elements 102E (e.g., a touchscreen, keyboard, touchpad, sensors such as biometric sensors, etc.), a speaker 102H, and a microphone 102F. The communication device 102 may also include an antenna 102D for wireless data transfer.

The computer readable medium 102B may comprise code, executable by the processor, for implementing methods according to embodiments. For example, the computer readable medium 102B may comprise code, executable by the processor 102A for implementing a method comprising: performing a message exchange process with a user device, wherein a cryptogram is received from the user device by the communication device during the message exchange process; transmitting a provisioning request message including a user device identifier and the cryptogram to the server computer, which generates an authorization request message comprising the cryptogram, transmits the authorization request message to an authorizing computer, which verifies the cryptogram; and receiving the access data.

The computer readable medium 102B may contain a service provider application 102B-1, an access device emulation API 102B-2, and a provisioning request module 102B-3. The access device emulation API 102B-2 may further contain an application selection sub-module. The service provider application 102B-1 can, in conjunction with the processor 102A, allow the communication device 102 to communicate with a service provider computer. It can provide functions provided by a service provider. Examples of service provider applications can include digital wallet applications, payment applications, merchant applications, transit applications, applications to access secure data, etc.

The communication device's 102 operating system (OS) may implement a set of access device emulation APIs 102B-2 which allow the service provider application 102B-1 to gain access to the contactless element interface 102I and exchange transaction data communications with the contactless element of a user device. For example, the access device emulation APIs 102B-2 may include programming function calls to allow the service provider application 102B-1 to receive, process, and respond to communications such Application Protocol Data Unit (APDU) commands sent from a contactless element of a user device. In this manner, the communication device 102 is able to emulate the functions an access device such as a badge reader or a POS terminal. The service provider application 102B-1 may also cause the provisioning request module 102B-3 and the processor 102A to initiate, receive, process, and respond to message communications with the processing server computer 105 related to provisioning access data (such as a payment token) to the service provider application 102B-1.

In some embodiments, the contactless element interface 102I is implemented in the form of a semiconductor chip (or other data storage element) with an associated wireless transfer (e.g., data transmission) element, such as an antenna. Data or control instructions that are transmitted via a cellular network may be applied to the contactless element interface 102I. Contactless element interface 102I may be capable of transferring and receiving data using a short range wireless communication capability. Thus, the communication device 102 may be capable of communicating and transferring data or control instructions via both a cellular network (or any other suitable wireless network—e.g., the Internet or other data network) or any short range communications mechanism.

Figure 3:
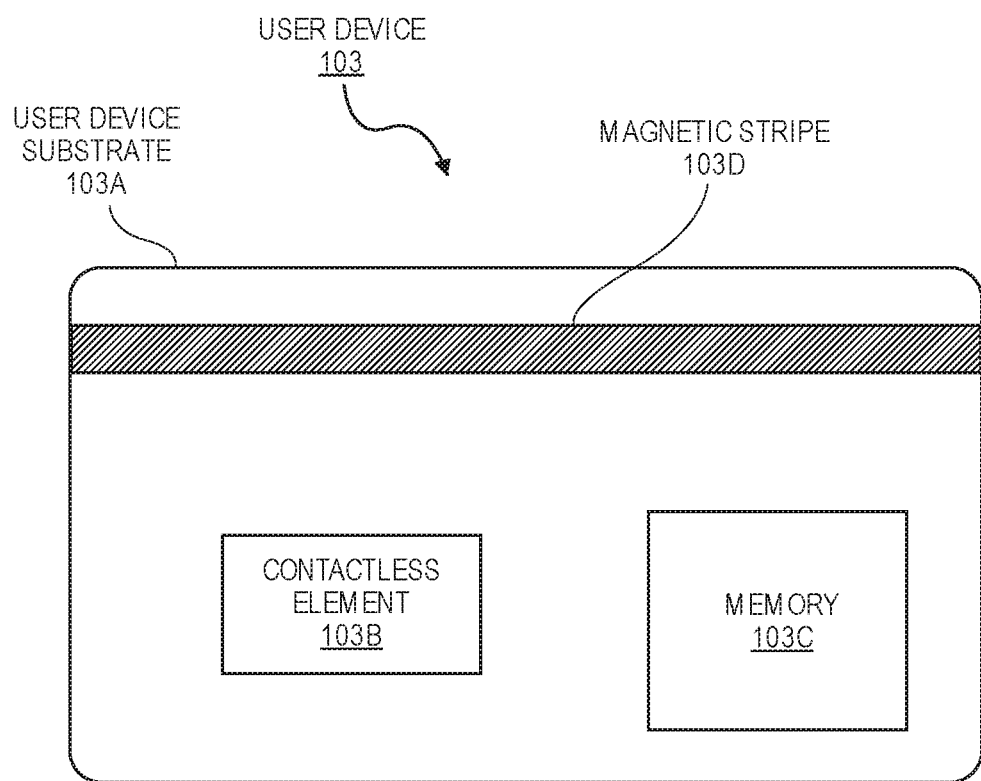
FIG. 3 shows a diagram of a user device according to an embodiment.

FIG. 3 shows a user device 103 according to an embodiment. The user device 103 comprises a substrate 103A such as a plastic substrate. A contactless element 103B for interfacing with a data access or data transfer device may be on or embedded within the user device substrate 103A. The contactless element 103B may include a chip, and may include the capability to communicate and transfer data using near field communications (NFC) technology or other short range communications technology. The user device 103 may also include a memory 103C, which may store user information such as an account number, expiration date, and a user name. Such information may also be printed or embossed on the substrate 103A. The substrate 103A may also have a magnetic stripe 103D on it.

Figure 4:
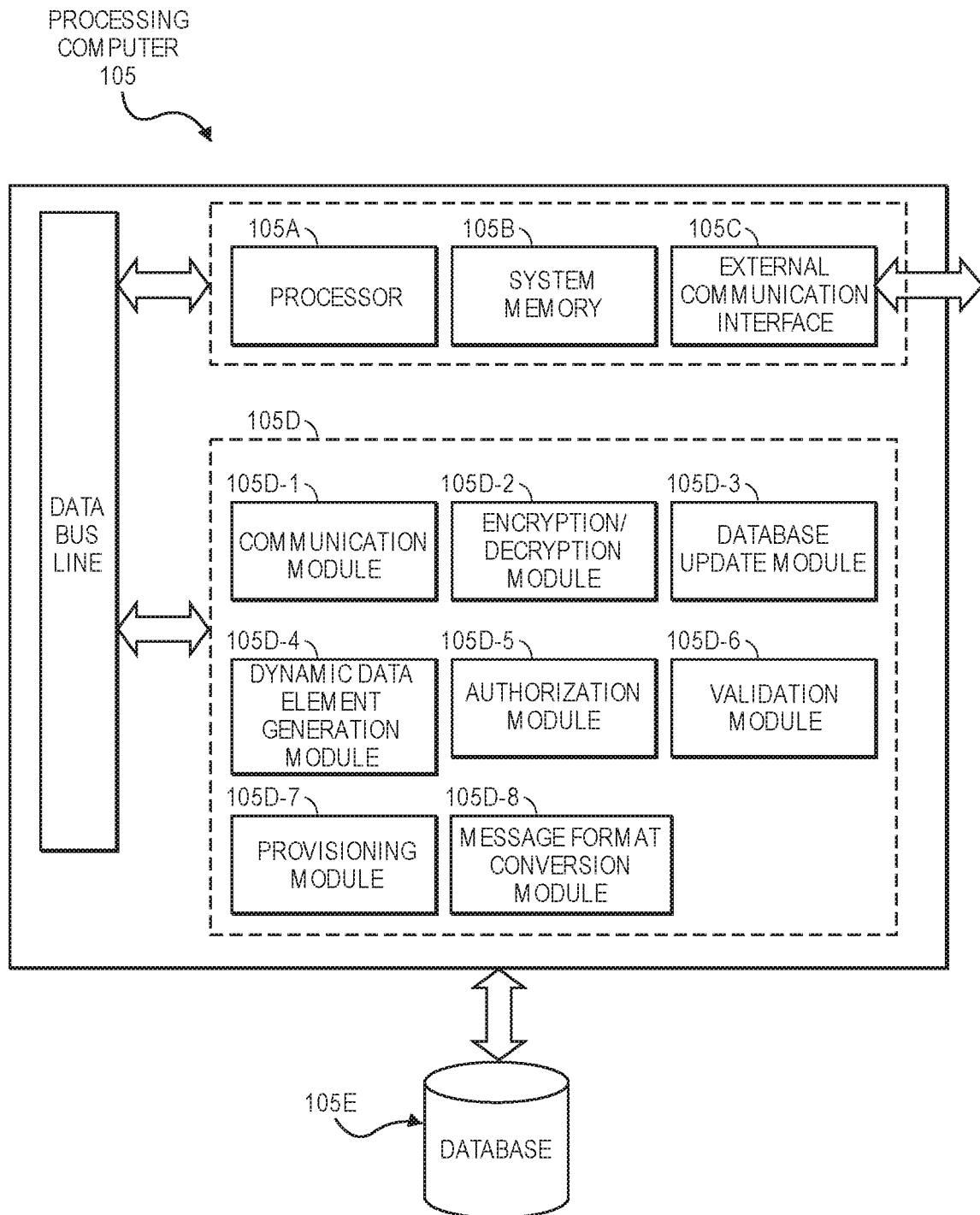
FIG. 4 shows a block diagram of a processing server computer according to an embodiment.

FIG. 4 shows a block diagram of a processing server computer 105 according to an embodiment. The processing server computer 105 may comprise a processor 105A, which may be coupled to a system memory 105B and an external communication interface 105C. A computer readable medium 105D may also be operatively coupled to the processor 105A. A database 105E may also be in operative communication with the processor 105A. The database 105E may contain access data such as tokens and/or account data, as well as mappings between the access data, and credentials and/or communication device identifiers such as phone numbers, IP addresses, device identifiers, etc.

The computer readable medium 105D may comprise code, executable by the processor 105A to perform a method comprising: receiving, from a communication device, a provisioning request message including a user device identifier and a cryptogram in a first message format, which is received from the user device by the communication device during a message exchange process between the user device and the communication device; generating an authorization request message in a second message format, the authorization request message comprising the cryptogram; transmitting the authorization request message to an authorizing computer; receiving an authorization response message from the authorizing computer; and in response to receiving the authorization response message, providing access data to the communication device.

The computer readable medium 105D may comprise a number of software modules including a communication module 105D-1, an encryption/decryption module 105D-2, a database update module 105D-3, a dynamic data element generation module 105D-4, an authorization module 105D-5, a validation module 105D-6, a provisioning module 105D-7, and a message format conversion module 105D-8.

The communication module 105D-1 may comprise code that causes the processor 105A to generate messages, forward messages, reformat messages, and/or otherwise communicate with other entities.

The encryption/decryption module 105D-2 may include any suitable encryption/decryption algorithms to encrypt data in embodiments of the invention. Suitable data encryption/decryption algorithms may include DES, triple DES, AES, etc. It may also store encryption keys that can be used with such encryption/decryption algorithms. The encryption/decryption module 105D-2 may utilize symmetric or asymmetric encryption techniques to encrypt and/or verify data. Cryptographic keys that may be used by the encryption/decryption module 105D-2 may be securely stored in the system memory 105B.

The database update module 105D-3 may comprise code that causes the processor 105A to update the database 105E. The database 105E may be updated with account information, token to credential to device information mapping, provisioning information, etc.

The dynamic data element generation module 105D-4 may comprise code that causes the processor 105A to generate a dynamic data element such as a random number, time and/or date, etc. In some embodiments, one or more dynamic data elements may be used as input data for a cryptogram.

The authorization module 105D-5 may comprise code that can cause the processor 105A to evaluate provisioning request messages and determine if access data (e.g., payment token) should be provided to the requestor. The authorization module 105D-5 may also include code for routing or modifying authorization request and response messages as they pass between various parties such as issuers and acquirers.

The validation module 105D-6 may include any suitable code for validating codes or data. In some embodiments, the validation module 105D-6 may validate encrypted data packets received from a communication device 102. The validation module 105D-6 may also include code to compare data to determine if a match is present.

The provisioning module 105D-7 can include code, executable by the processor 105A to provision communication devices with access data.

The message format conversion module 105D-8 may include code, executable by the processor 105A to convert messages from one message format to another different message format. The message format conversion module 105D-8 may include mapping software, which may map data elements in data fields in a first message in a first message format (e.g., an XML data format) to corresponding data fields in a second message in the different message format (e.g., an ISO 8583 message format).

Figure 5:
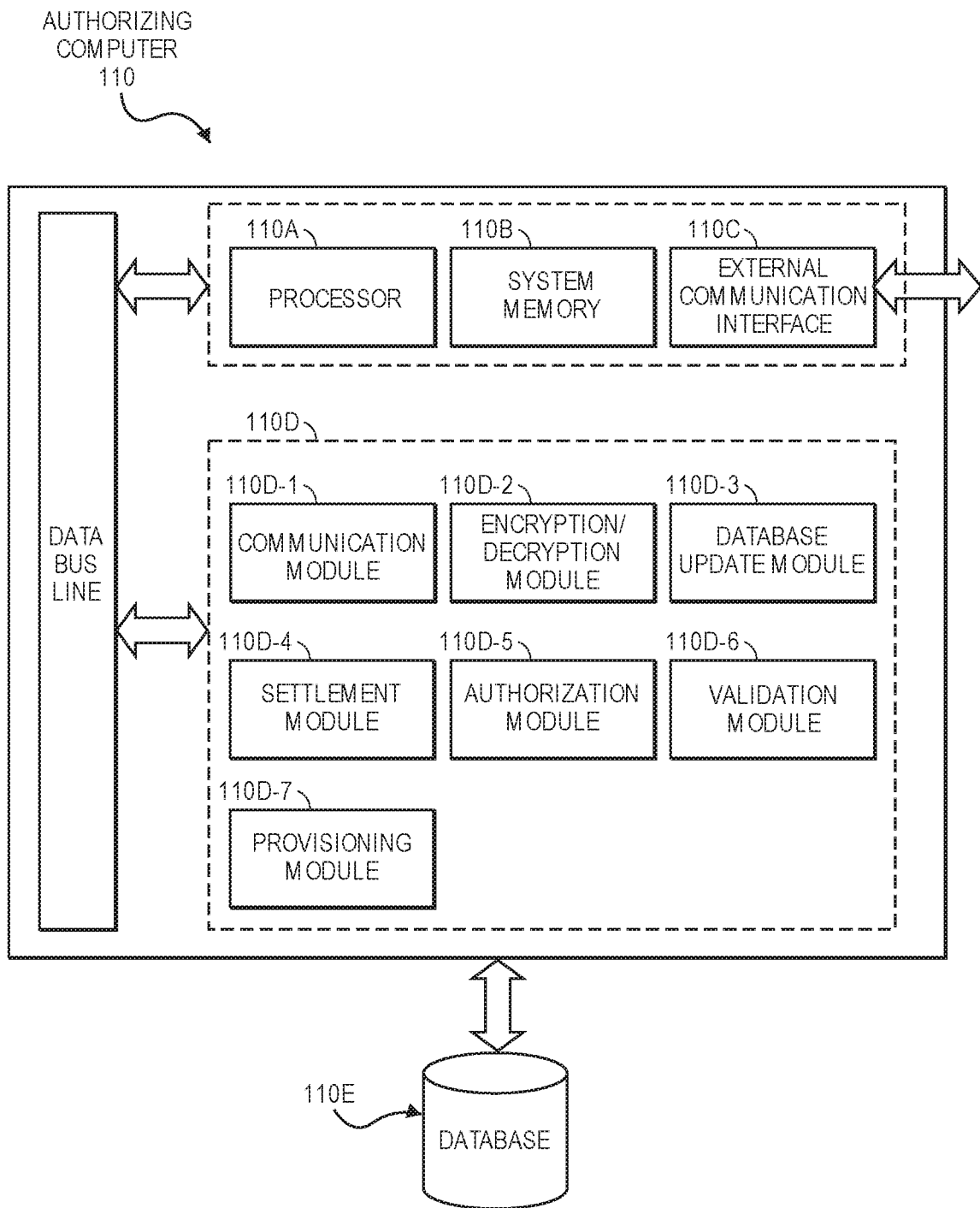
FIG. 5 shows a block diagram of an authorizing computer according to an embodiment.

FIG. 5 shows a block diagram of an authorizing computer 110 according to an embodiment. The authorizing computer 110 may comprise a processor 110A, which may be coupled to a system memory 110B and an external communication interface 110C. A computer readable medium 110D may also be operatively coupled to the processor 110A. A database 110E may also be in operative communication with the processor 110A. The database 110E may contain account data.

The computer readable medium 110D may comprise code, executable by the processor 110A to perform a method comprising: receiving, from a processing computer, an authorization request message comprising a nominal or zero dollar amount, a cryptogram that was previously generated by a user device that interacted with a communication device; authorizing or declining the authorization request message; generating an authorization response message; and transmitting the authorization response message to the processing computer.

The computer readable medium 110D may comprise a number of software modules including a communication module 110D-1, an encryption/decryption module 110D-2, a database update module 110D-3, a settlement module 110D-4, an authorization module 110D-5, and a validation module 110D-6.

The communication module 110D-1 may comprise code that causes the processor 110A to generate messages, forward messages, reformat messages, and/or otherwise communicate with other entities.

The encryption/decryption module 110D-2 may include any suitable encryption/decryption algorithms to encrypt data in embodiments of the invention. Suitable data encryption/decryption algorithms may include DES, triple DES, AES, etc. It may also store encryption keys that can be used with such encryption/decryption algorithms. The encryption/decryption module 110D-2 may utilize symmetric or asymmetric encryption techniques to encrypt and/or verify data. Cryptographic keys that may be used by the encryption/decryption module 110D-2 may be securely stored in the system memory 110B.

The database update module 110D-3 may comprise code that causes the processor 110A to update the database 110E. The database 110E may be updated with account information, authorization data, etc.

The settlement module 110D-4 may comprise code that causes the processor 110A to perform settlement processing with a settlement entity such as the processing computer.

The authorization module 110D-5 may comprise code that can cause the processor 110A to evaluate an authorization request message to determine if it should or should not be authorized. A determination as to whether or not an authorization request message should or could not be authorized may include whether or not a received cryptogram is determined to be valid, and/or whether an account associated with a user has sufficient funds or credit to authorize the transaction being conducted.

The validation module 110D-6 may include any suitable code for validating codes or data. In some embodiments, the validation module 110D-6 may validate encrypted data packets received from a communication device 102. The validation module 110D-6 may also include code to compare data to determine if a match is present.

The provisioning module 110D-7 can include code, executable by the processor 110A to provision communication devices with access data.

Figure 6:
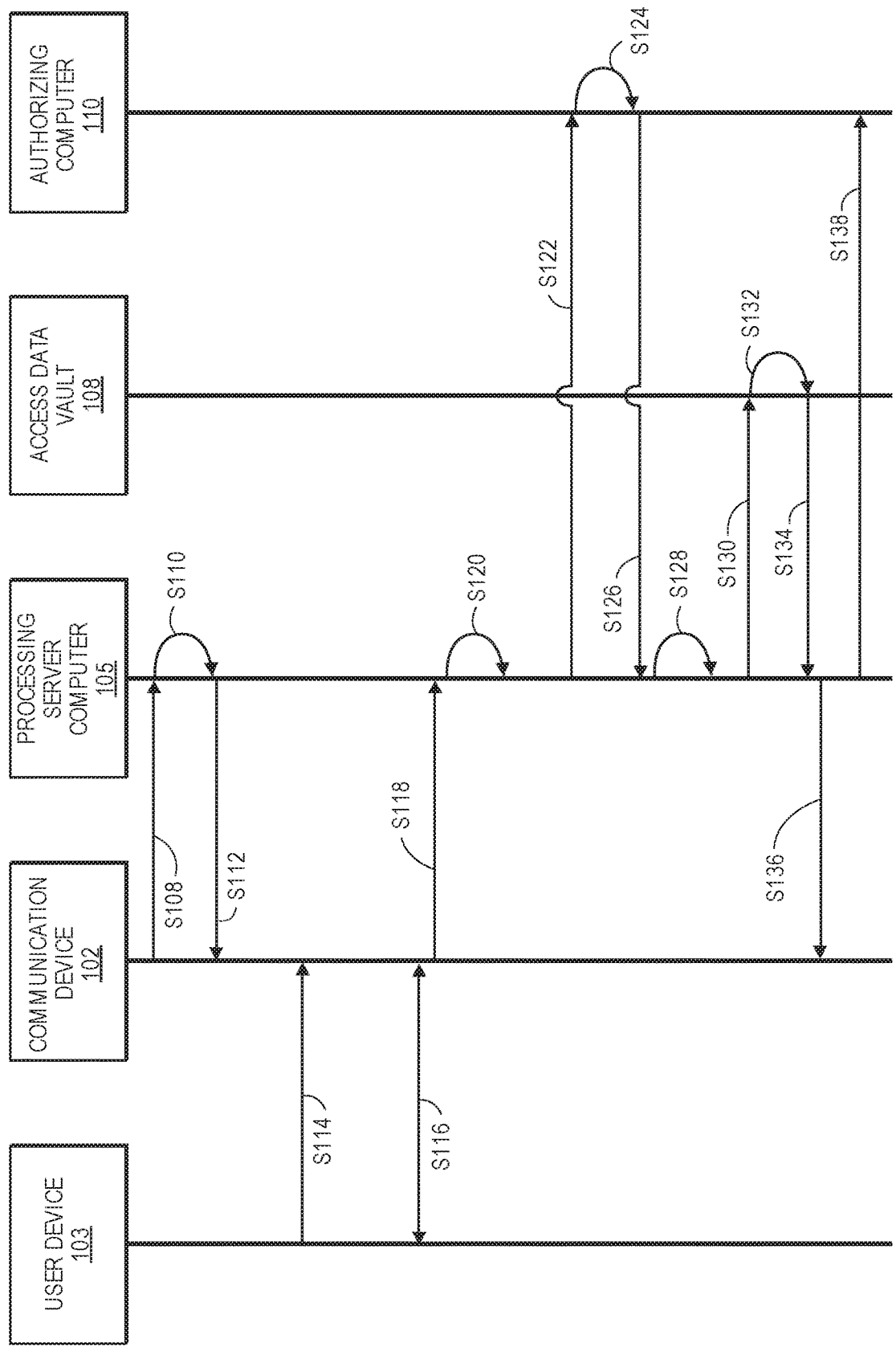
FIG. 6 shows a flow diagram depicting a provisioning method according to an embodiment.

FIG. 6 shows a flow diagram illustrating a method of securely provisioning access data to a service provider application 102B-1 (e.g., an access application, a digital wallet application, etc.) on a communication device 102 (e.g., mobile phone) using authentication data received from a user device 103 (e.g., contactless payment card), according to an embodiment. The description below may also reference elements in FIGS. 1-5.

At step S108, a user of the communication device 102 may wish to provide access data to an application on the communication device 102. Specifically, the communication device 102 may generate an initialization request message to provision access data to a service provider application 102B-1 (e.g., a digital wallet application) on the communication device 102. Once the user of the communication device 102 is ready to send the provisioning initialization request message to a processing server computer 105, the user may select an appropriate indicator on the mobile communication device 102. For example, the user may select a "Send," "+," "Add card to digital wallet," or any other suitable option presented on a display of the communication device 102. The service provider application 102B-1 may then execute a provisioning request module 102B-3 to transmit the provisioning initialization request message to the processing server computer 105. The initialization request message may be transmitted from the communication device 102 to the processing server computer 105 using any suitable electronic message format including an e-mail, a short messaging service (SMS) message, a multimedia messaging service (MMS) message, a hypertext transfer protocol (HTTP) request message, a transmission control protocol (TCP) packet, a web form submission, etc. The message may be directed to any suitable address associated with the processing server computer 105, including an e-mail address, a telephone number, an internet protocol (IP) address, or a uniform resource locator (URL).

At step S110, the processing server computer 105, after receiving the initialization request message from the communication device 102 to provision access data, may generate a dynamic data element by executing a dynamic data element generation module 105D-4. Examples of dynamic data elements may include an application transaction counter (ATC), a random number, a time of day, etc. The dynamic data elements are dynamic in that they can change frequently (e.g., with each or nearly each interaction). Also, in some embodiments, the processing server computer 105 may generate a session ID that is associated with the dynamic data element.

At step S112, the processing server computer 105 may transmit the dynamic data element and the optional session ID to the communication device 102. The service provider application 102B-1 on the communication device 102 may receive the dynamic data element and then prompt the user to present the user device 103 to the communication device 102 (e.g., displaying a message "Tap card against phone").

At step S114, the user may present the user device 103 to the communication device 102 by placing the user device 103 proximate to the contactless element interface 102I of the communication device 102. The user can move the user device 103 closer to the communication device 102 until data can be exchanged between the two devices. In some embodiments, the user device 103 may contact the communication device 102.

At step S116, the communication device 102 may perform a message exchange process with the user device 103. During the message exchange process, a cryptogram is received by the communication device 102 from the user device 103. The message exchange process can be one that would normally be performed during an access transaction to access a resource, even though the current request to provision the communication device with access data may not be considered a request to access a resource such as a good, service, location, or secure data.

In some embodiments, the message exchange process uses an enhanced data interface protocol for communicating information between the communication device 102 and the user device 103. For example, one exemplary implementation of the concepts described herein includes a message exchange process comprising APDU commands such as "get processing option" and "application identifier" request and response messages. In some embodiments, the message exchange process includes the transmission of a numerical value such as 0 dollars from the communication device 102 to the user device 103. Also, in some embodiments, the user device 103 may provide the communication device 102 with transaction processing information, including a primary account number (PAN) and an expiration date associated with the primary account number. Further details regarding an exemplary message exchange process are described below in reference to FIG. 7.

In some embodiments, the cryptogram that is transmitted from the user device 103 to the communication device 102 in step S116 is generated by encrypting, using at least one key on the user device 103, at least the dynamic data element that the communication device 102 received from the processing server computer 105 at step S112, a user device identifier from the user device 103, and optionally the numerical value and other information. In some embodiments, the user device identifier may be the PAN.

The cryptogram may be generated in any suitable manner. For example, in some embodiments, the at least one cryptographic key on the user device 103 is derived from data existing on the user device 103. In some embodiments, the processing server computer 105 and the user device 103 may share symmetric encryption keys that will allow them to encrypt and decrypt the cryptogram. In other embodiments, the processing server computer 105 and the user device 103 may respectively utilize a public key to encrypt a portion of a cryptogram and a private key to decrypt a portion of the cryptogram. The encryption utilized may include any type of encryption methodology. For example, this encryption step may utilize DES, Triple-DES, AES, etc. encryption. Further details regarding an exemplary cryptogram generation process are described below in reference to FIG. 8.

At step S118, the communication device 102 may transmit a provisioning request message to the processing server computer 105. The provisioning request message may include the user device identifier and the cryptogram received from the user device 103 during step S116. In some embodiments, the communication device 102 may provide the provisioning request message to the processing server computer 105 via the service provider application 102B-1, which may subsequently utilize the provisioning request module 102B-3 to transmit the message. In some embodiments, the provisioning request message may include an encrypted portion (e.g., cryptogram generated in step S116) and a non-encrypted portion (e.g., a PAN or a key index which can be used to locate an encryption key in a database). The non-encrypted portion may be used to decrypt the encrypted portion and recover data in the encrypted portion.

In some embodiments, the non-encrypted portion may be used to generate one or more keys that are used to decrypt the encrypted portion. In some embodiments, the communication device 102 may transmit the session ID received by the communication device 102 at step S112 as part of the non-encrypted portion of the provisioning request message. This may allow the processing server computer 105 to associate the provisioning request message with the dynamic data element that the processing server computer 105 generated in step S110.

The provisioning request message may be in the form of an e-mail, a short messaging service (SMS) message, a multimedia messaging service (MMS) message, a hypertext transfer protocol (HTTP) request message, a transmission control protocol (TCP) packet, a web form submission, etc.

At step S120, the processing server computer 105, having received the provisioning request message sent by the communication device 102 in step S118, may generate an authorization request message comprising the user device identifier, the cryptogram, the dynamic data element, and a value. The value may be a transaction amount such as a nominal or zero dollar amount. The authorization request message may be in a message format (e.g., a second message format) that is different than the message format (e.g., a first message format) of the provisioning request message. For example, the provisioning request message may be in a format such as an XML data format, while the authorization request message may be in a format such as an ISO 8583 message format. The message format conversion module 150 in conjunction with the data processor 150A may perform the message format conversion process.

At step S122, once formed, the processing server computer 105 can transmit the authorization request message to the authorizing computer 110.

At step S124, after receiving the authorization request message, the authorizing computer 110 may extract the cryptogram from the authorization request message, and may execute the encryption/decryption module 110D-2 to perform decryption of the cryptogram using an appropriate second cryptographic key, and may recover the dynamic data element from the cryptogram. If the authorizing computer 110 determines that it can decrypt the cryptogram and recover data elements in the cryptogram, then the authorizing computer 110 may be assured that an authentic user device created the cryptogram, since presumably only an authentic user device would have the first cryptographic key (which formed the cryptogram) corresponding to the second cryptographic key stored by the authorizing computer 110. The processing server computer 105 then determines if the value of the dynamic data element, generated at step S110 and received in the authorization request message, matches the value of the recovered dynamic data element. If the recovered dynamic data element and the previously generated dynamic data element do not match, then the authorization request message may be declined by the authorizing computer 110. The authorizing computer 110 may also determine of the amount of the transaction can be authorized. For example, the amount may be $0 or a nominal amount such as $0.28, and the authorizing computer 110 may determine if the account associated with the user identifier in the authorization request message contains sufficient funds or credit to authorize the transaction.

At step S126, if the cryptogram is validated by the authorizing computer 110 and the transaction amount is also verified by the authorizing computer, then the authorizing computer 110 may transmit an authorization response message including the user identifier and a positive authorization indicator to the processing server computer 105.

At step S128, after receiving the authorization response message, the processing server computer 105 may analyze the authorization response message to see if it contains a positive authorization indicator. If it does, then the processing server computer 105 can be assured that the authorizing computer 110 verified the cryptogram.

At step S130, if the authorization response message contained a positive authorization result, then the processing server computer 105 may transmit an access data request message, containing at least the user device identifier to the access data vault 108. In some embodiments, the access data request message may contain details needed to provision the communication device 102 with access data. For example, such details may include the address (e.g., phone number) associated with the communication device 102, the user device 103 details (e.g., the PAN), any other suitable data.

At step S132, the access data vault 108 may retrieve the requested access data.

At step S134, the access data vault 108 may transmit the access data (e.g., token) to the processing server computer 105. The processing server computer 105 may receive the access data, and in some embodiments will store the access data and related information received from the access data vault 108 in a database 105E via a database update module 105D-3. Such information may include the address (e.g., phone number) of the communication device 102, any data that is used by the communication device 102 to accept the access data, etc.

At step S136, provisioning module 105D-7 of the processing server computer 105 may transmit the access data received at step S134 to the service provider application 102B-1 of the communication device 102. The communication device 102 may thereafter be used to conduct access transactions using the service provider application 102B-1 and the access data that was provisioned to it. In some embodiments, the access data may be stored in a secure area (e.g., a secure element) in the communication device 102. Also, in some embodiments, the service provider application 102B-1 may communicate a confirmation message to the user. For example, the confirmation message may display "Card is connected" on the communication device display 102G.

In step S138, if the amount in the original authorization request message contained a nominal amount (e.g., $0.27), then the processing server computer 105 may transmit a transaction reversal message to the authorizing computer 110. The authorizing computer 110 can then reverse the amount of the transaction so that the user's account is not debited for the transaction amount.

The above described process can be used to provision static or dynamic access data to a communication device 102. If the access data is dynamic, it may be provided to the communication device 102 for every transaction or for a predetermined number of transactions (e.g., for every 5-10 transactions). This reduces the risk of fraud that might result from man-in-the-middle attacks.

Figure 7:
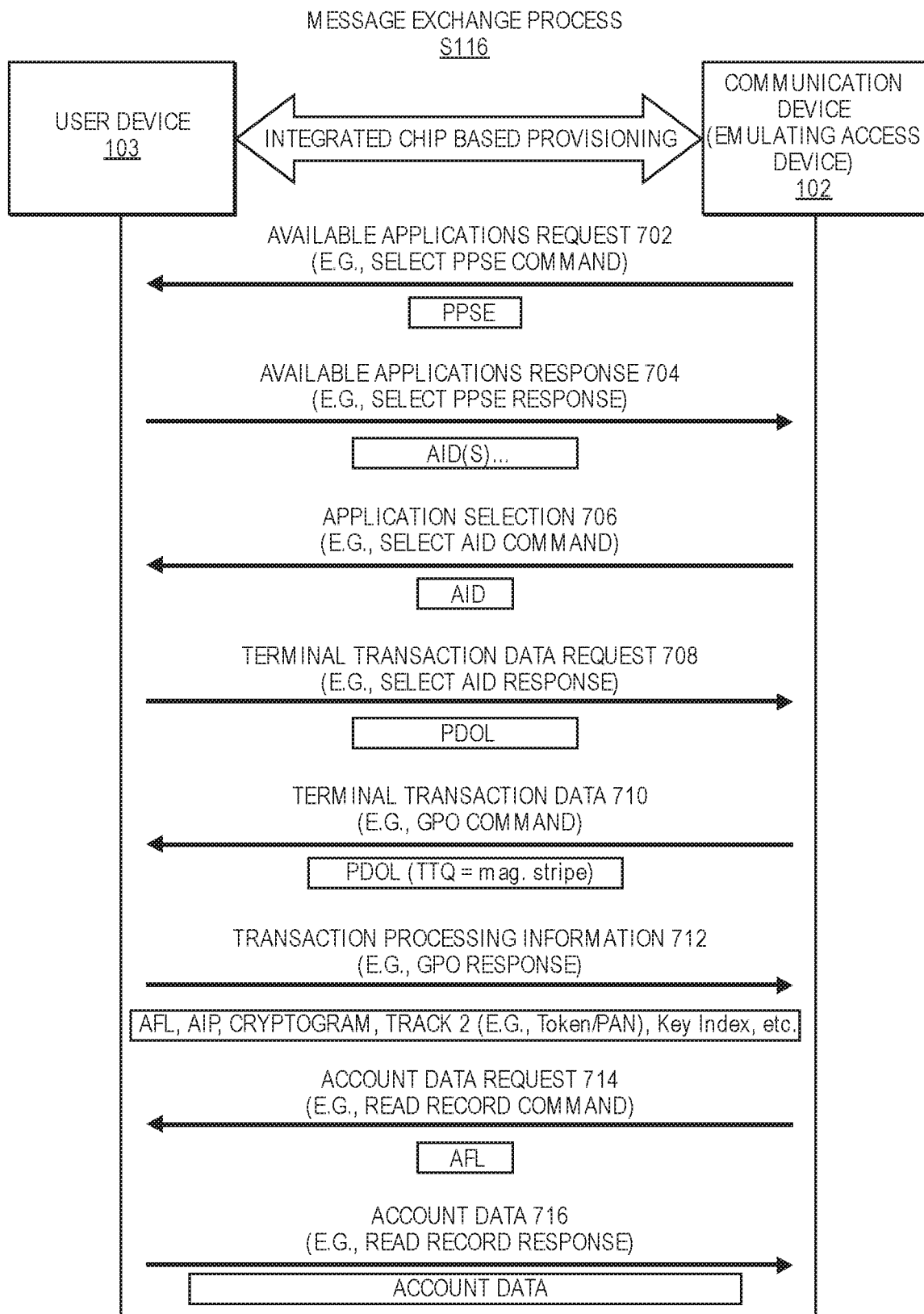
FIG. 7 shows a flow diagram depicting a message exchange process between a communication device and a user device.

FIG. 7 shows a flow diagram of the message exchange process S116 in FIG. 6 between the user device 103 and the communication device 102. The message exchange process illustrated in FIG. 7 relates to a payment interaction process between a contactless device such as a contactless card, and a POS terminal. Other message exchange processes may be used in other contexts. In one embodiment, the service provider application 102B-1 of the communication device 102 may execute an access device emulation (ADE) application programming interface (API) 102B-2. The ADE API may include programming function calls to allow the service provider application 102B-1 to emulate an access device to receive, process, and respond to provisioning communications such as Application Protocol Data Unit (APDU) commands sent from the user device 103.

For example, in one exemplary embodiment, the user device 103 is a contactless payment card. As explained above in step S114 in FIG. 6, the user may present their user device 103 to the communication device 102 by placing the user device 103 in proximity to the contactless element interface 102I of the communication device 102. When the communication device 102 detects the presence of user device 103, an application selection module of the ADE API 102B-2 may initiate a message exchange process by sending an available application request 702 to the user device 103. In some embodiments, the available applications request 702 may be in the form of a "select proximity payment system environment (PPSE)" command. In such embodiments, the request for available applications may include a payment environment identifier (e.g., a PPSE name such as "2PAY.SYS.DDF01") to identify the payment environment supported by the ADE API 102B-2 of the communication device 102.

Upon receiving the available applications request 702, the user device 103 may identify and process the request by recognizing the payment environment identifier (e.g., PPSE name) included in the request, and respond by sending an available applications response 704 back to the ADE API 102B-2 of the communication device 102. The available applications response 704 may include a list of available account application identifiers (AIDs), application configuration options associated with the available AIDs, and may include the proximity payment environment identifier (e.g., PPSE name) as the dedicated file name. Also, in some embodiments, such as the case where the user device 103 may be a mobile communication device, the available applications response 704 may include a wallet identifier associated with a mobile application. In some embodiments, the available applications response 704 may be in the form of a "select PPSE" response and may include PPSE file control information (FCI). For example, the available applications response 704 may include a directory entry for each available AID on the contactless user device 103. In some embodiments, there may be a wallet identifier associated with each available AID. Each directory entry may include information such as the AID, an application label associated with the AID (e.g., a mnemonic associated with the AID such as "Visa Debit"), an application priority indicator indicating the priority of the AID, a kernel identifier indicating the application's kernel preference, and/or additional information relating to the particular AID. The available applications response 704 may also include other data such as FCI issuer discretionary data or any other relevant information.

The communication device 102 may determine a supported account application based on the received available AIDs and may send an "application selection" command 706 including the selected AID to the contactless user device 103.

Additionally, in some embodiments, upon receiving the application selection message 706, the contactless user device 103 may send a terminal transaction data request 708 to request transaction data from the communication device 102 which may be needed complete the provisioning process for the selected application associated with the selected AID. In some embodiments, the terminal transaction data request 708 may be in the form of a "Select AID Response" and may include application identifier (AID) file control information (FCI) with the selected AID as the dedicated file name. The terminal transaction data request may include a list of transaction data identifiers to request the appropriate data from the communication device 102 (via the ADE API 102B-2, emulating a POS terminal), and the list of transaction data identifiers can be in the form of a processing options data object list (PDOL).

The transaction data requested by the contactless user device 103 for the transaction may include an entity identifier associated with the communication device 102, terminal processing options (TPO), an amount, communication device identifier, and other information. In addition, the transaction data may include the dynamic data element (e.g., the random number) previously generated by the processing server computer 105. In other embodiments, the transaction information may be provided as part of the application selection message 706 and/or as part of the available applications request 702.

After receiving the terminal transaction data request 708, the communication device 102 may send to the contactless user device 103 the terminal transaction data 710 requested by the contactless user device 103. In some embodiments, the terminal transaction data 710 may be sent in the form of a get processing options (GPO) command, and may include the requested terminal transaction data 710 in a processing options data object list (PDOL). In some embodiments, the terminal transaction data 710 (e.g., Transaction Processing Options (TPO)) may include a TPO indicator that indicates which transaction data types the communication device 102 supports. As noted in some embodiments, to facilitate the provisioning process by utilizing APDU commands, the communication device 102 may send the contactless user device 103 a zero dollar value as part of the terminal transaction data 710. It should be understood that in some embodiments, the value may be any amount.

Once the user device 103 receives the terminal transaction data 710, the user device 103 obtains relevant card credentials from its contactless element 103B, and may send a set of transaction processing information 712 to the communication device 102. In some embodiments, the transaction processing information 712 can be sent in the form of a "get processing options" (GPO) response. In some embodiments, the transaction processing information may include one or more application file locators (AFLs) that can be used as file addresses by communication device 102 to read account data stored on the user device 103, and an application interchange profile (AIP) that can be used to indicate the capabilities of the payment application.

The transaction processing information 712 may include any credentials for the transaction including a cryptogram generated using transaction information, Track-2 equivalent data (e.g., PAN, expiration date), and/or additional data. For example, the cryptogram may be generated using transaction information, which may include at least the previously described dynamic data element (e.g., the random number), the user device identifier (e.g., a PAN), and optionally other information such as a session identifier, a value such as a zero dollar amount, and a transaction counter. The transaction processing information 712 may also include issuer application data (IAD), a form factor indicator (FFI), card transaction qualifiers (CTQ), cryptogram information data (CID), and/or an application PAN sequence number (PAN). In some embodiments, the issuer application data (IAD) may include a length indicator indicating the length of the IAD, cryptogram version number (CVN) indicating the version of the transaction cryptogram, a derived key indicator (DKI) that can be used to identify a master key (e.g., a master key associated with the issuer), and/or card verification results (CVR). Further details regarding the cryptogram generation process are described below in reference to FIG. 8.

After the communication device 102 receives the transaction processing information 712, the communication device 102 may send an account data request 714 to the user device 103 to read additional account data that may be stored on the user device 103. In some embodiments, the account data request 714 may be in the form of a "read record" command, and may include an application file locator (AFL) indicating the location of the account data that the communication device 102 is attempting to read. The AFL included in the account data request 714 may correspond to an AFL in the transaction processing information 712 that was provided to the communication device 102 from user device 103.

In response to receiving the account data request 714 from the communication device 102, the contactless user device 103 may send the account data 716 stored at the location indicated by the AFL to communication device 102. In some embodiments, the account data 716 may be sent in the form of a "read record" response. The account data 716 may include, for example, application usage control that indicates the issuer's restrictions on usage and services allowed for the application, the cardholder's name, customer exclusive data, issuer country code, and/or other account related data that is accessible at the AFL location and is stored in the user device 103.

Figure 8:
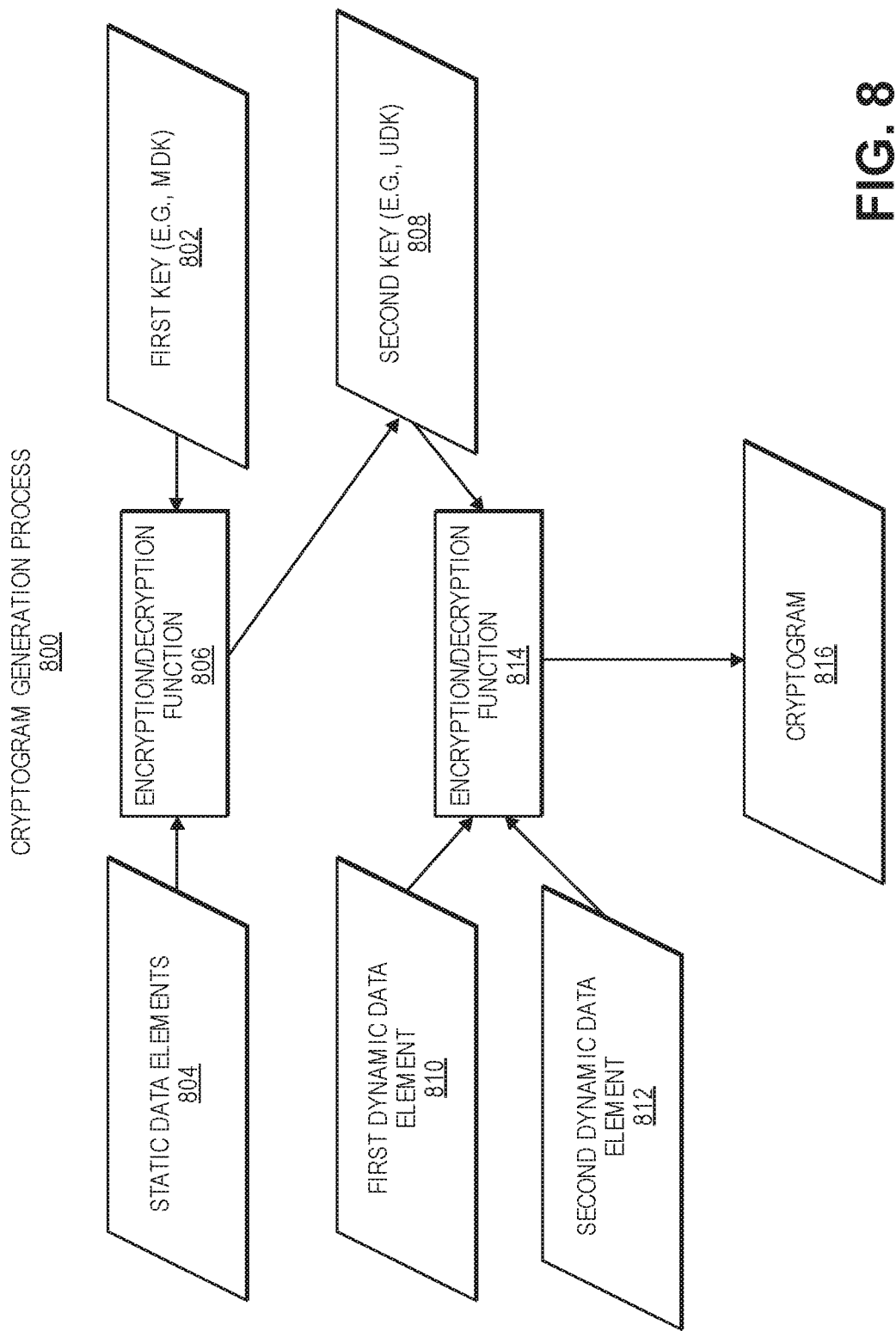
FIG. 8 shows a block diagram of the encryption process for generating a cryptogram according to an embodiment.

FIG. 8 shows a flow diagram of the process wherein a user device 103 generates a cryptogram according to one embodiment.

In some embodiments, cryptogram generation process 800 may begin by the user device 103 encrypting static data elements 804 with a first encryption key 802 on the user device 103, using an encryption function 806 to generate a second encryption key 808. The first encryption key 802 may be a base key that is associated with the issuer of the user's account, and the base key may be associated with a group of accounts. For example, the first encryption key 802 may be associated with a group of accounts within a BIN or PAN range designated for the payment service associated with this type of user device 103. Each user device 103 can be personalized within its functionality to derive keys unique to the payment service from data existing on the user device 103 (e.g., static data elements 804). In some embodiments, the first encryption key 802 may be a master derivation key (MDK) associated with the issuer of the account associated with the static data elements 804, and the first encryption key 802 may also be maintained at the processing server computer 105.

The static data elements 804 may include account identifying information such as an account identifier (e.g., a PAN), an alternate account identifier (e.g., an alternate PAN), or a token that is a substitute for an account identifier, and may additionally include user identifying information such as a sequence number (e.g., a PAN sequence number (PSN)) that identifies the particular user of the account (e.g., when multiple users use the same account). For example, the static data elements 804 that are used as the input to encryption function 806 can be a concatenation of the account identifying information and the user identifying information, or an inverted version of the concatenation.

In some embodiments, the second encryption key 808 being generated from the account information may include multiple portions that are each generated from different variations of the account information. For example, the second encryption key 808 may be divided into two portions. The first portion of the second encryption key 808 may be generated by encrypting the account information using the first encryption key 802. The second portion of the second encryption key 808 may be generated by inverting the account information and encrypting the inverted account information using the first encryption key 802. The encryption function 806 used to generate the second encryption key 808 may be, for example, triple data encryption standard (TDES) or other suitable encryption algorithms, and may use an initial chaining vector of binary zeros. In some embodiments, the second encryption key 808 generated from the account information may correspond to a unique derivation key (UDK) for the account.

In one exemplary embodiment, cryptogram generation process 800 may continue by encrypting at least two dynamic data elements 810, 812 using the second encryption key 808. By using at least two (or more) dynamic data elements to create a cryptogram, it is highly unlikely that a skimmer can determine the cryptogram. In some embodiments, examples of dynamic data elements may include an application transaction counter (ATC), a dynamic data element generated by a processing server computer (e.g., a random number), a time of day, etc. The dynamic data elements are dynamic in the sense that they change frequently, such as with transaction or nearly each transaction, or at frequent time intervals (e.g., every day or every few days). In some embodiments, dynamic data element 810 corresponds to the dynamic data element S110 that was first generated at processing server computer 105, transmitted to the communication device 102 at step S112 in FIG. 6, and further transmitted by the communication device 102 to the user device 103 during the message exchange process S116. It should be understood that, although in some exemplary embodiments, at least two dynamic data elements are encrypted to form the cryptogram, in some embodiments only one dynamic data element may be encrypted.

In some embodiments, a numeric string (not shown) of predetermined length may be created as input to be encrypted by encryption/decryption function 814. This numeric string may be created by overlaying the first dynamic data element (e.g., ATC) over the corresponding leftmost digits of the account number for the payment service or PAN. This numeric string may be concatenated on the right with the second dynamic data element (such as the randomly generated number received from the communication device 102 in FIG. 6, S116) to produce a concatenated value. If necessary, padding characters are concatenated on the right of the concatenated value to form a numeric string with a predetermined fixed length. This numeric string may be encrypted by encryption/decryption function 814 by using the second encryption key 808. In some embodiments, this numeric string may be bisected into two blocks. Also, in some embodiments, encryption/decryption function 814 may further encompass a series of sub-steps (not shown). In these sub-steps, the two blocks resulting from the bisection of the numerical string may each be encrypted and/or decrypted using one or both portions of the divided second encrypted key, and/or exclusively OR'd (XOR) with the resulting blocks. This series of sub-steps may produce the transaction cryptogram 816.

Once the communication device is provisioned with access data, it may be used to conduct access transactions.

Figure 9:
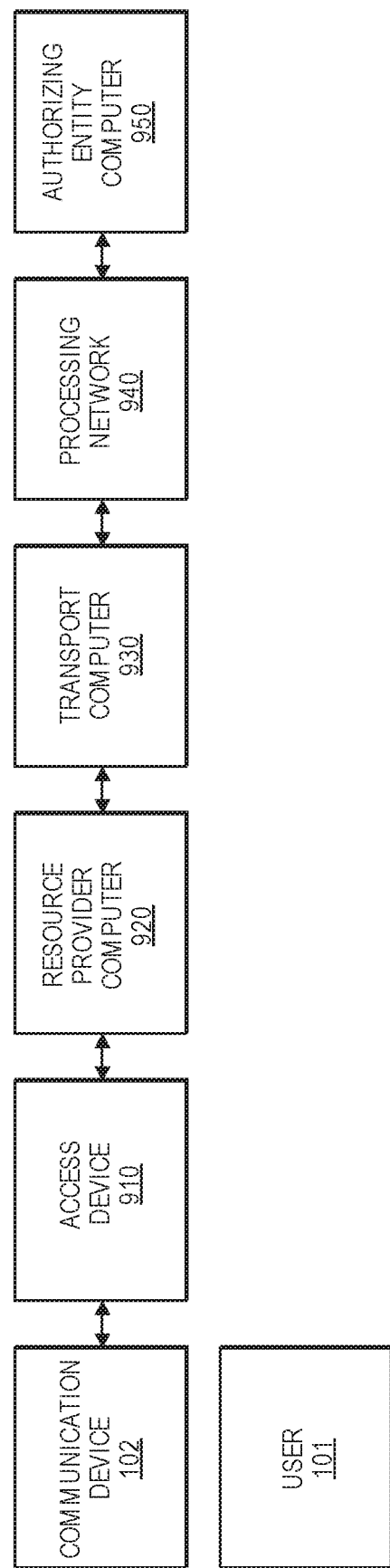
FIG. 9 shows a block diagram illustrating a payment processing system.
Figure 10:
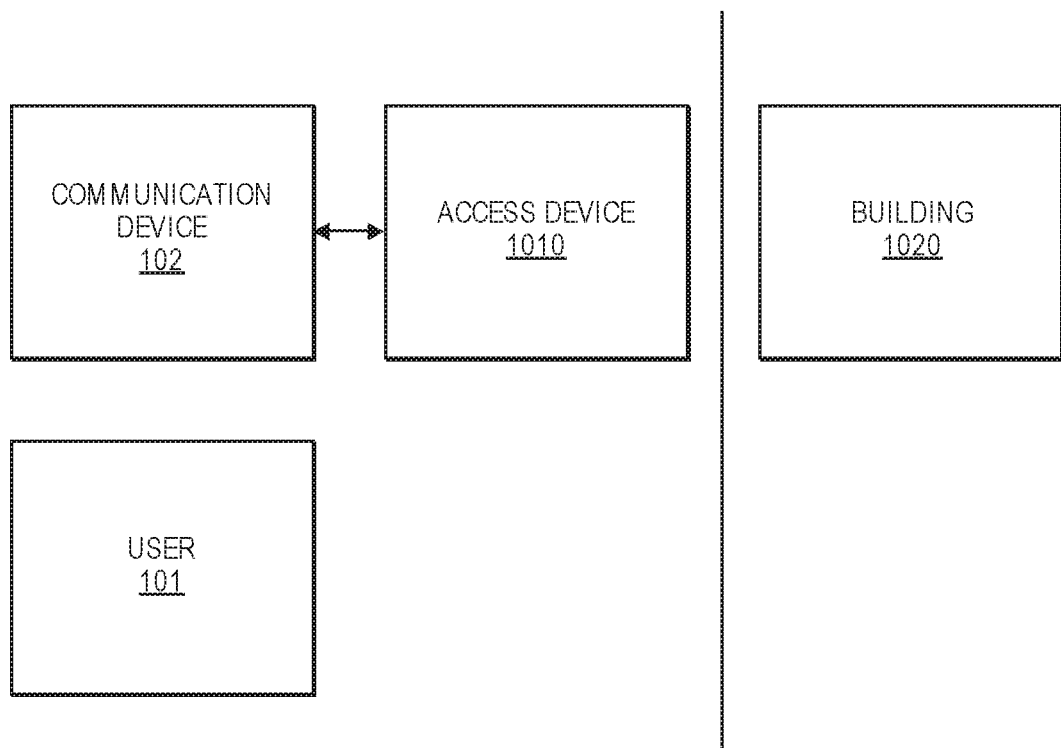
FIG. 10 shows a block diagram illustrating a building access system.

FIGS. 9 and 10 describe systems and methods which include the use of access data on a communication device in different contexts.

FIG. 9 shows a block diagram of a transaction processing system wherein a user 101 operates a communication device 102 that has been provisioned with access data (e.g., a token). The user 101 may use the communication device 102 to pay for a good or service at a resource provider such as a merchant. The merchant may operate a resource provider computer 920 and/or an access device 910. The merchant may communicate with an authorizing entity computer 950 operated by an issuer, via a transport computer 930 operated by an acquirer and a processing network 940 such a payment processing network.

The payment processing network may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The payment processing network may use any suitable wired or wireless network, including the Internet.

A typical payment transaction flow using a communication device 102 (which has been provisioned with access data by utilizing a user device 103) at an access device 910 (e.g., POS location) can be described as follows. A user 101 presents his or her communication device 102 to an access device 910 to pay for an item or service. The communication device 102 and the access device 910 interact such that access data from the communication device 102 (e.g., PAN, a payment token, verification value(s), expiration date, etc.) is received by the access device 910 (e.g., via contact or contactless interface). The resource provider computer 920 may then receive this information from the access device 910 via an external communication interface. The resource provider computer 920 may then generate an authorization request message that includes the information received from the access device 910 (i.e. information corresponding to the user device 103) along with additional transaction information (e.g., a transaction amount, merchant specific information, etc.) and electronically transmits this information to a transport computer 930. The transport computer 930 may then receive, process, and forward the authorization request message to a processing network 940 for authorization.

In general, prior to the occurrence of a credit or debit-card transaction, the processing network 940 has an established protocol with an issuer on how the issuer's transactions are to be authorized. In some cases, such as when the transaction amount is below a threshold value, the processing network 940 may be configured to authorize the transaction based on information that it has about the user's account without generating and transmitting an authorization request message to the authorizing entity computer 950. In other cases, such as when the transaction amount is above a threshold value, the processing network 940 may receive the authorization request message, determine the issuer associated with the user device 103, and forward the authorization request message for the transaction to the authorizing entity computer 950 for verification and authorization. Once the transaction is authorized, the authorizing entity computer 950 may generate an authorization response message (that may include an authorization code indicating the transaction is approved or declined) and transmit this electronic message via its external communication interface to processing network 940. The processing network 940 may then forward the authorization response message to the transport computer 930, which in turn may then transmit the electronic message comprising the authorization indication to the resource provider computer 920, and then to the access device 910.

If the access data is in the form of a token, then the processing network 940 may exchange the token for a real credential (e.g., a PAN). Any authorization request message may then be modified to include the real credential and it may be forward to the authorizing entity computer 950 for verification. The authorizing entity computer 950 can generate an authorization response message with an approval or decline. The authorization response message can be transmitted to the processing network 940, and the processing network 940 may replace the credential with the token. The processing network 940 may then transmit the authorization response message back to the access device 910.

At the end of the day or at some other suitable time interval, a clearing and settlement process between the resource provider computer 920, the transport computer 930, the processing network 940, and the authorizing entity computer 950 may be performed on the transaction.

FIG. 10 shows a block diagram of a building access system, and a communication device 102 operated by a user 101. The communication device 102 has been provisioned with access data (e.g., a token) as described above, utilizing a contactless user device 103 (e.g., contactless card). The communication device 102 can interact with the access device 1010 and pass access data to the access device 1010. The access device 1010 may locally verify the received access data or it may communicate with a remotely located authentication server computer (not shown). The remotely located authentication server computer may verify that the access data is authentic and may transmit a signal indicating this back to the access device 1010. The access device 1010 may then proceed to let the user 101 enter the building 1020.

Embodiments of the disclosure provide for a number of technical advantages over conventional systems. For example, by providing a mechanism in which a communication device 102 may emulate an access device 910 when being provisioned with access data (including receiving, processing, and responding to transaction communications from a user device 103), this improves security by allowing the processing network 940 to verify that the user device's credentials are actually associated with an authentic user device 103 (e.g., genuinely issued payment card). Also, embodiments allow the processing network 940 to verify that the provisioning of access data to the communication device 102 is being performed within the same session that the user device 103 is presented to the communication device 102, thereby reducing man-in-the-middle attacks. Also, embodiments of allow a processing computer to verify that an authentic user device was used to request provisioning of access data, even though it does not possess the cryptographic keys that would allow for it to verify any cryptograms generated by authentic user devices. Embodiments use an existing messaging infrastructure to perform the verification process, even though the specific messaging infrastructure was not originally designed or intended for that purpose.

It should be understood that any of the embodiments of the present disclosure can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present disclosure using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present disclosure may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the disclosure will become apparent to those skilled in the art upon review of the disclosure. The scope of the disclosure should, therefore, be determined not with reference to the above description, but instead should be determined with reference to the pending claims along with their full scope or equivalents.

One or more features from any embodiment may be combined with one or more features of any other embodiment without departing from the scope of the disclosure.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
   receiving, by an authorizing computer from a server computer, an authorization request message in a second message format after mapping data elements of a provisioning request in a first message format to corresponding data elements of the authorization request message in the second message format, the authorization request message provided in response to the server computer receiving an initialization request message in the first message format from a communication device to provision access data, the authorization request message comprising a cryptogram formed using at least a dynamic data element provided by the server computer in response to receiving the initialization request message and a first cryptographic key that is on a user device that provided the cryptogram to the communication device, wherein the first message format is different than the second message format;
   validating, by the authorizing computer, the cryptogram using a second cryptographic key on the authorizing computer;
   generating, by the authorizing computer, an authorization response message comprising a positive authorization result; and
   transmitting, by the authorizing computer to the server computer, the authorization response message comprising the positive authorization result, wherein the server computer provides access data to the communication device in response to receiving the authorization response message and evaluating the positive authorization result.

2. The method of claim 1, wherein the communication device is a mobile phone and the user device is a card.

3. The method of claim 1, wherein the cryptogram is formed using a DES or triple DES encryption process.

4. The method of claim 1, wherein the first message format is an HTTP/S message format, and the second message format is an ISO 8583 message format.

5. The method of claim 1, wherein the authorization request message comprises a zero amount.

6. The method of claim 1, wherein the authorization request message further comprises a nominal value.

7. The method of claim 1, wherein the authorization request message comprises a credential that is also stored on the user device.

8. The method of claim 1, wherein the first cryptographic key is derived on the user device.

9. The method of claim 1, wherein the access data comprises data that can allow a user of the communication device to access a secure location.

10. An authorizing computer comprising:
    a processor; and
    a computer readable medium, the computer readable medium comprising code, executable by the processor to implement a method comprising:
    receiving, from a server computer, an authorization request message in a second message format after mapping data elements of a provisioning request in a first message format to corresponding data elements of the authorization request message in the second message format, the authorization request message provided in response to the server computer receiving an initialization request message in the first message format from a communication device to provision access data, the authorization request message comprising a cryptogram formed using at least a dynamic data element provided by the server computer in response to receiving the initialization request message and a first cryptographic key that is on a user device that provided the cryptogram to the communication device, wherein the first message format is different than the second message format;
    validating the cryptogram using a second cryptographic key on the authorizing computer;
    generating an authorization response message comprising a positive authorization result; and transmitting, to the server computer, the authorization response message comprising the positive authorization result, wherein the server computer provides access data to the communication device in response to receiving the authorization response message and evaluating the positive authorization result.

11. The authorizing computer of claim 10, wherein the authorization request message further comprises a zero value amount, and a user device identifier.

12. The authorizing computer of claim 10, wherein the authorization response message comprises a user device identifier.

13. The authorizing computer of claim 10, wherein the access data comprises a token.

14. The authorizing computer of claim 10, wherein the authorizing request message comprises a nominal amount.

* * * * *